(12) United States Patent
Chaubey et al.

(10) Patent No.: US 11,569,986 B2
(45) Date of Patent: *Jan. 31, 2023

(54) DECRYPTION OF SECURE SOCKETS LAYER SESSIONS HAVING ENABLED PERFECT FORWARD SECRECY USING A DIFFIE-HELLMAN KEY EXCHANGE

(71) Applicant: Juniper Networks, Inc., Sunnyvale, CA (US)

(72) Inventors: Rajeev Chaubey, Bangalore (IN); Venkata Rama Raju Manthena, Cupertino, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 466 days.

This patent is subject to a terminal disclaimer.

(21) Appl. No.: 15/894,654

(22) Filed: Feb. 12, 2018

(65) Prior Publication Data

US 2018/0167207 A1 Jun. 14, 2018

Related U.S. Application Data

(63) Continuation of application No. 14/751,605, filed on Jun. 26, 2015, now Pat. No. 9,893,883.

(51) Int. Cl.
*H04L 29/06* (2006.01)
*H04L 29/08* (2006.01)
(Continued)

(52) U.S. Cl.
CPC .......... *H04L 9/0841* (2013.01); *H04L 63/061* (2013.01); *H04L 63/168* (2013.01)

(58) Field of Classification Search
CPC .... H04L 63/061; H04L 63/168; H04L 9/0841
See application file for complete search history.

(56) References Cited

U.S. PATENT DOCUMENTS 6,978,367 B1 12/2005 Hind
7,290,133 B1 10/2007 Montgomery et al.
(Continued)

OTHER PUBLICATIONS

Komar B., et al., "Troubleshooting Certificate Status and Revocation," Microsoft Corporation, Nov. 1, 2003, 53 pages.
(Continued)

*Primary Examiner* — Mohammad A Siddiqi
(74) *Attorney, Agent, or Firm* — Harrity & Harrity, LLP

(57) ABSTRACT

A device may receive client cipher information, associated with initiating a secure session, identifying at least one key exchange cipher supported by a client device associated with the secure session. The device may determine, based on the client cipher information, that a Diffie-Hellman key exchange is to be used to establish the secure session. The device may determine whether a server device, associated with the secure session, supports use of the Diffie-Hellman key exchange. The device may manage establishment of the secure session using a first decryption technique based on determining that the server device does not support the use of the Diffie-Hellman key exchange, or manage establishment of the secure session using a second decryption technique based on determining that the server device supports the use of the Diffie-Hellman key exchange or being unable to determine whether the server device supports the use of the Diffie-Hellman key exchange.

19 Claims, 8 Drawing Sheets

(51) Int. Cl.
  *H04L 9/08* (2006.01)
  *H04L 9/40* (2022.01)

(56) References Cited

U.S. PATENT DOCUMENTS

| | | | |
|---|---|---|---|
| 7,536,544 B2 | 5/2009 | Xiao et al. | |
| 7,739,744 B2 | 6/2010 | Burch et al. | |
| 8,032,742 B2 | 10/2011 | Bergerson et al. | |
| 8,438,618 B2 | 5/2013 | Eldar | |
| 8,549,300 B1 | 10/2013 | Kumar | |
| 8,615,795 B2 | 12/2013 | Cottrell | |
| 8,869,259 B1 | 10/2014 | Udupa et al. | |
| 8,996,873 B1 | 3/2015 | Pahl et al. | |
| 8,996,973 B2 | 3/2015 | Pahl | |
| 9,338,147 B1 | 5/2016 | Rothstein | |
| 9,397,839 B2 | 7/2016 | Thoniel et al. | |
| 9,462,006 B2 | 10/2016 | Uzun | |
| 9,735,970 B1* | 8/2017 | Shohat | H04L 9/3268 |
| 9,774,452 B2 | 9/2017 | Bjarnason | |
| 9,893,883 B1* | 2/2018 | Chaubey | H04L 63/168 |
| 10,193,698 B1 | 1/2019 | Das et al. | |
| 10,291,589 B1* | 5/2019 | Sharifi Mehr | H04L 63/205 |
| 10,291,651 B1 | 5/2019 | Chaubey | |
| 10,454,689 B1* | 10/2019 | Sharifi Mehr | H04L 9/3247 |
| 2003/0074584 A1 | 4/2003 | Ellis | |
| 2004/0158704 A1* | 8/2004 | Oates | H04L 63/0428 |
| | | | 713/151 |
| 2005/0278534 A1 | 12/2005 | Nadalin et al. | |
| 2006/0095388 A1 | 5/2006 | Brown et al. | |
| 2006/0155997 A1* | 7/2006 | Fritzges | H04L 63/0428 |
| | | | 713/171 |
| 2009/0060188 A1* | 3/2009 | McGrew | H04L 9/0841 |
| | | | 380/259 |
| 2010/0250995 A1* | 9/2010 | Savitzky | H04L 9/0841 |
| | | | 713/401 |
| 2010/0306525 A1* | 12/2010 | Ferguson | H04L 63/0442 |
| | | | 713/151 |
| 2012/0005746 A1 | 1/2012 | Wei | |
| 2012/0166806 A1 | 6/2012 | Zhang | |
| 2012/0226900 A1 | 9/2012 | Rodgers | |
| 2012/0246475 A1 | 9/2012 | Yoo et al. | |
| 2013/0198511 A1 | 8/2013 | Yoo | |
| 2013/0318343 A1 | 11/2013 | Bjarnason | |
| 2014/0040637 A1 | 2/2014 | Hameed | |
| 2014/0304499 A1 | 10/2014 | Gopinath et al. | |
| 2015/0067338 A1 | 3/2015 | Gero | |
| 2015/0172064 A1 | 6/2015 | Takenaka | |
| 2015/0188699 A1* | 7/2015 | Sung | H04L 9/0838 |
| | | | 713/153 |
| 2016/0021110 A1* | 1/2016 | Sugano | H04L 63/0823 |
| | | | 713/156 |
| 2016/0119318 A1 | 4/2016 | Zollinger | |
| 2016/0119374 A1 | 4/2016 | Williams et al. | |
| 2016/0226827 A1* | 8/2016 | Bohannon | H04L 63/0281 |
| 2017/0048714 A1 | 2/2017 | Attfield et al. | |

OTHER PUBLICATIONS

Nbilly, https://live.paloaltonetworks.com/t5/learning-articles/differences-between-SSL-forward-proxy-and-inbound-inspection/ta-p/55553, Oct. 16, 2013, 3 pages.
Palo Alto Networks, "Decryption," Pan-OS Administrator's Guide Version 6.1, May 13, 2015, 30 pages.
Wikipedia, "Server Name Indication," http://en.wikipedia.org/wiki/Server_Name_Indication, May 15, 2015, 7 pages.
Blue Coat, "Technology Primer: Secure Sockets Layer (SSL)", Blue Coat Systems, Inc., 2008, 22 pages.
Wikipedia, "Forward secrecy," http://en.wikipedia.org/wiki/Forward_secrecy, May 9, 2015, 4 pages.
Scott Helme, "Perfect Forward Secrecy—An Introduction", https://scotthelme.co.uk/perfect-forward-secrecy/, May 10, 2014, 7 pages.

* cited by examiner

US 11,569,986 B2

DECRYPTION OF SECURE SOCKETS LAYER SESSIONS HAVING ENABLED PERFECT FORWARD SECRECY USING A DIFFIE-HELLMAN KEY EXCHANGE

RELATED APPLICATIONS

This application is a continuation of U.S. patent application Ser. No. 14/751,605 filed Jun. 26, 2015 (now U.S. Pat. No. 9,893,883), which relates to U.S. patent application Ser. No. 14/751,332, filed on Jun. 26, 2015, and U.S. patent application Ser. No. 14/751,409, filed on Jun. 26, 2015, the contents of which are incorporated by reference herein in their entirety.

BACKGROUND

A Diffie-Hellman key exchange may be used for securely exchanging cryptographic keys over a public network. The Diffie-Hellman key exchange allows two devices that have no prior knowledge of each other to jointly establish a shared secret key over the public channel. The shared secret key may then be used to encrypt a session key and/or traffic associated with a symmetric key cipher.

SUMMARY

According to some possible implementations, a method may include receiving, by a device, client cipher information associated with initiating a secure session, where the client cipher information may identify one or more key exchange ciphers supported by a client device associated with the secure session; determining, by the device and based on the client cipher information, that the client device prefers use of a Diffie-Hellman key exchange to establish the secure session; determining, by the device, whether a server device, associated with the secure session, supports the use of the Diffie-Hellman key exchange to establish the secure session; and selectively establishing, by the device, the secure session using a first decryption technique or a second decryption technique based on determining whether the server device supports the use of the Diffie-Hellman key exchange, where the first decryption technique may be different from the second decryption technique.

According to some possible implementations, a device may include one or more processors to: receive client cipher information associated with initiating a secure session, where the client cipher information may identify at least one key exchange cipher supported by a client device associated with the secure session; determine, based on the client cipher information, that a Diffie-Hellman key exchange is to be used to establish the secure session; determine whether a server device, associated with the secure session, supports use of the Diffie-Hellman key exchange to establish the secure session; and manage establishment of the secure session using a first decryption technique based on determining that the server device does not support the use of the Diffie-Hellman key exchange; manage establishment of the secure session using a second decryption technique based on determining that the server device supports the use of the Diffie-Hellman key exchange; or manage establishment of the secure session using the second decryption technique based on being unable to determine whether the server device supports the use of the Diffie-Hellman key exchange.

According to some possible implementations, a computer-readable medium may store instructions that, when executed by one or more processors, cause the one or more processors to: receive client cipher information associated with initiating a secure sockets layer session or a transport layer security session (SSL/TLS session), where the client cipher information may identify a set of key exchange ciphers supported by a client device associated with the SSL/TLS session; determine, based on the client cipher information, that a Diffie-Hellman key exchange is to be used to establish of the SSL/TLS session; determine whether a server device, associated with the SSL/TLS session, supports use of the Diffie-Hellman key exchange to establish of the SSL/TLS session; and establish the SSL/TLS session using a SSL forward proxy technique based on determining that the server device supports the use of the Diffie-Hellman key exchange or based on being unable to determine whether the server device supports the use of the Diffie-Hellman key exchange; or establish the SSL/TLS session using a SSL inbound inspection technique based on determining that the server device does not support the use of the Diffie-Hellman key exchange.

DETAILED DESCRIPTION

Figure 1:
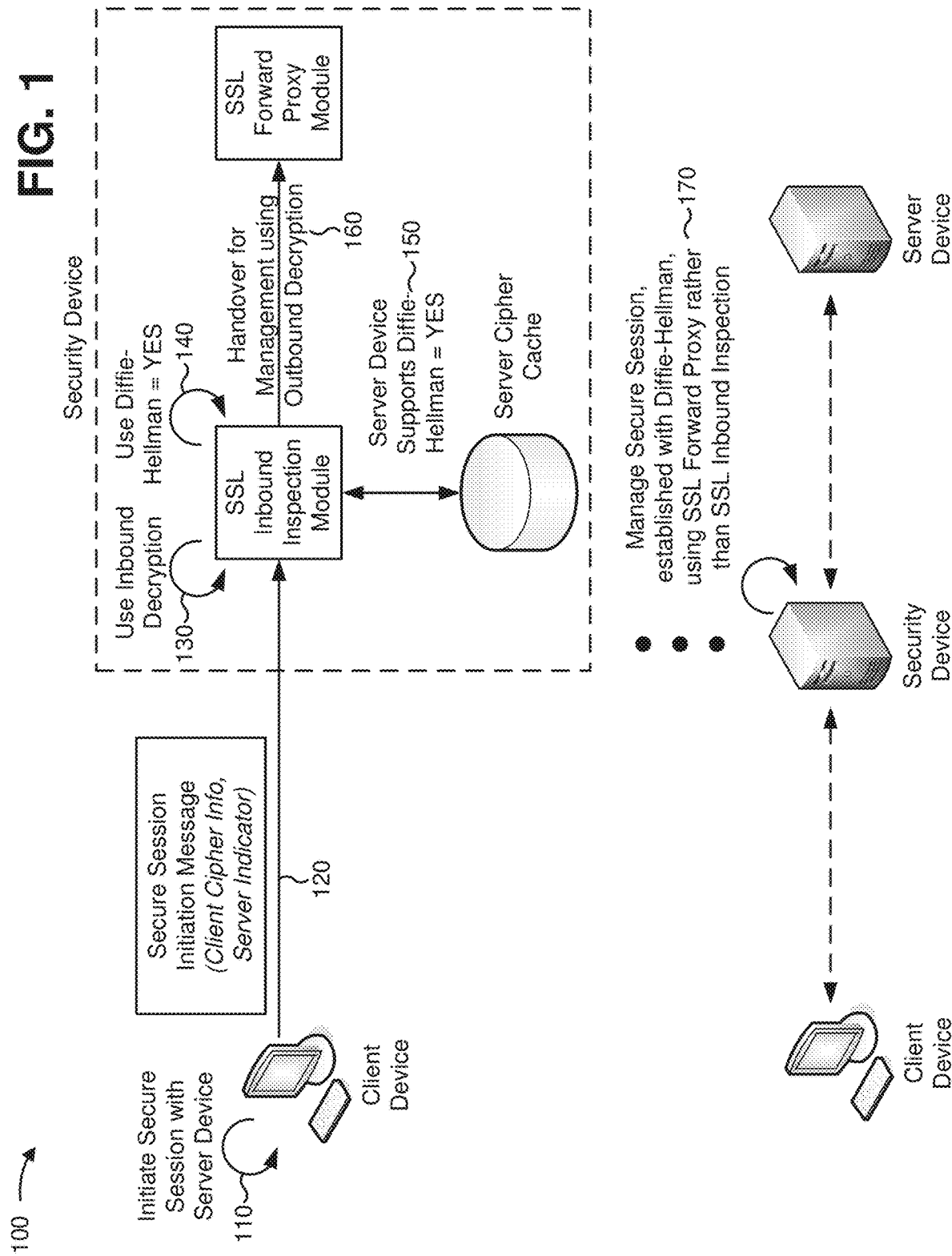
FIG. 1 is a diagram of an overview of an example implementation described herein.

The following detailed description of example implementations refers to the accompanying drawings. The same reference numbers in different drawings may identify the same or similar elements.

A security device may host a firewall associated with managing (e.g., inspecting, processing, monitoring, etc.) traffic provided by and/or destined for a client device and/or a server device. In some implementations, the client device may be capable of initiating a secure session with the server device to allow the traffic to be encrypted (e.g., for security purposes, for privacy purposes, etc.). For example, the client device may be capable of initiating a SSL/TLS session or a TLS session (herein referred to as a SSL/TLS session) with the server device. As such, the security device may need to be capable of decrypting the encrypted traffic in order to inspect the traffic and enforce a security policy associated with the secure session In some implementations, the security device may be capable of using multiple, different types of decryption techniques to manage the encrypted traffic associated with the secure session. For example, the security device may be capable of using a SSL forward proxy technique in order to manage encrypted traffic associated with a secure session.

When implementing the SSL forward proxy technique, the security device may split the secure session into two parts and act as a man-in-the-middle (e.g., between the client device and the server device). Using a RSA key exchange, the security device may receive a server certificate, provided by the server device, and may forward a copy of the server certificate to the client device after replacing a server public key, associated with the server certificate, with a public key associated with the security device. Here, the security device may also sign the server certificate with certificate authority details associated with the security device.

The client device may generate a master key for the secure session and encrypt the master key using the public key in the server certificate. Since the security device has replaced the server public key with the security public key, the security device may have access to a corresponding private security key and may decrypt the master key for the session. As such, the security device may have access to the session key and may be capable of decrypting encrypted traffic associated with the secure session. The SSL forward proxy technique may be implemented in a case where the server device is not known to the security device. Similarly, the security device may be capable of using a reverse proxy technique to manage the encrypted traffic (e.g., in order to offload SSL processing from the server device), where the session between the reverse proxy and the server device may or may not be a SSL/TLS session.

As another example, the security device may be capable of using a SSL inbound inspection technique in order to manage encrypted traffic associated with the secure session. In this case, the security device may store or have access to a server private key associated with the server device and corresponding to the server public key. Here, when the client device encrypts the session key using the server public key for a RSA key exchange, the security device may decrypt the encrypted session key using the server private key. The security device may then decrypt traffic using the session key without acting as a man-in-the-middle of the SSL/TLS session. The SSL inbound inspection technique may be implemented in a case where the server device is known to the security device, and may be considerably faster than the SSL forward proxy technique when managing the encrypted traffic. Using the SSL inbound inspection technique, the security device may not participate in an SSL/TLS handshake associated with establishing the SSL/TLS session. Rather, parameters associated with the SSL/TLS session may be negotiated between the client device and the server device, and the security device may have access to a server private key and be capable of decrypting traffic associated with the SSL/TLS session.

In some cases, the client device and the server device may participate in a RSA key exchange, as described above, where, in the case of SSL inbound inspection, the client device encrypts a session key using a server public key, or, in the case of SSL forward proxy, the client device encrypts the session key using a security device public key. However, such RSA key exchanges may be secure only while the corresponding private key is uncompromised since the session key may be determined using the server private key in both SSL inbound inspection and SSL forward proxy scenarios. For example, if the corresponding private key is stolen by a third party at a later time, any SSL/TLS sessions recorded by the third party may be accessed using the corresponding private key (e.g., by determining session keys, corresponding to the SSL/TLS sessions, using the corresponding private key).

In some implementations, this problem may be alleviated with use of a Diffie-Hellman key exchange, whereby the client device and the server device establish a shared secret key to be used to encrypt the session key. The Diffie-Hellman key exchange may result in a different shared secret key for each session (e.g., thus enabling perfect forward secrecy). Thus, even if a shared secret key is compromised at a later time, only the SSL/TLS session corresponding to the shared secret key may be accessed. However, in such a case, the security device may not have access to the shared secret key (e.g., since the shared secret key is not provided by the client device or the server device at any time), and thus may not be capable of determining the session key. As such, the security device may be unable to decrypt the encrypted traffic and/or manage, inspect, process, or monitor the encrypted traffic.

Although, in a case where the security device is configured to use the SSL forward proxy technique, the security device may receive, from the client device a request to establish an SSL/TLS session using a Diffie Hellman key exchange. The client device may indicate such a request by having Diffie Hellman key exchange ciphers at a higher priority than a RSA key exchange. An SSL forward proxy module of the security device may try to switch establishment of the SSL/TLS session to using a Diffie-Hellman key exchange. For example, the security device may generate an interdicted certificate by replacing a server public key on the server certificate with a security device configured public key (security public key), and signing the server certificate with certificate authority details associated with the security device. The security device may then generate Diffie-Hellman parameters needed to create a session key, and use a private key, corresponding to the security public key on the interdicted certificate, to sign the Diffie-Hellman parameters. Here, the client device may authenticate the Diffie-Hellman parameters by verifying the signature using the security public key on the interdicted certificate, and may continue with generating the session key and establishing the SSL/TLS session. In this example, the SSL forward proxy module may similarly initiate a connection with the server device with Diffie-Hellman key exchange ciphers at higher priority. The server device may opt for Diffie-Hellman key exchange or downgrade the request to a RSA key exchange, and the SSL forward proxy module may continue session establishment as indicated by the server device.

In other words, the security device may establish a first shared secret key with the client device and a second shared secret key with the server device. Therefore, the security device may be capable of decrypting the encrypted session key provided by the client device, since the client device may encrypt the session key using the first shared secret key. Here, the security device may generate another session key and encrypt the other session key with a second shared key and provide the encrypted other session key to server device. Thus, by acting as a man-in-the-middle using the SSL forward proxy technique, the security device may be capable of determining the session key and decrypting the encrypted traffic associated with the SSL/TLS session.

However, in a case where the security device uses the SSL inbound inspection technique, the security device may not be capable of decrypting the encrypted session key since, for example, the security device does not act as a man-in-the-middle between the client device and the server device, and the Diffie-Hellman key exchange may take place without intervention by the security device. As such, the security device may not have access to the shared secret key, may be unable to decrypt the encrypted session key and, thus, may not decrypt the encrypted traffic associated with the SSL/TLS session. In this case, the security device may either drop the SSL/TLS session or allow the encrypted traffic to pass uninspected, both of which may be undesirable results in terms of customer experience, connection reliability, security, or the like.

Implementations described herein may allow a security device to determine whether a secure session is to be established using a Diffie-Hellman key exchange and, based on the determination, identify a decryption technique to be used for establishing and managing the secure session. This may allow the security device to operate at an improved level by using the SSL inbound inspection technique when possible, and switching to the SSL forward proxy technique when needed.

FIG. 1 is a diagram of an overview of an example implementation 100 described herein. For the purposes of example implementation 100, assume that a security device is positioned between a client device and a server device, and that the security device hosts a firewall associated with managing, inspecting, processing, monitoring, or the like, traffic provided by and/or destined for a client device.

As shown in FIG. 1, and by reference number 110, the client device may receive an indication to initiate a SSL/TLS session with server device. As shown by reference number 120, the client device may provide a message associated with initiating the SSL/TLS session with the server device. As shown, the message may include client cipher information, associated with the client device, and a server indicator associated with the server device. In some implementations, the client cipher information may include information that identifies one or more key exchange ciphers, supported by the client device, that may be used to establish the SSL/TLS session, such as a RSA key exchange, a Diffie-Hellman key exchange, an elliptic curve Diffie-Hellman key exchange, or the like. As a particular example, in some implementations, the message may include a client hello message that includes a supported cipher list for the client device, a TLS server name indication extension that includes a hostname associated with the server device, other information associated with an SSL handshake, or the like.

For the purposes of FIG. 1, assume that the security device is configured to inspect traffic provided by the client device, and analyze messages associated with initiating SSL/TLS sessions provided by the client device. Based on analyzing the message, the security device may (e.g., based on information included in a packet associated with the message) match a firewall rule to the client device, and may determine a decryption profile with which the firewall rule is associated. In some implementations, the decryption profile may include information that identifies a decryption technique that is to be used to manage encrypted traffic for the SSL/TLS session, such as a SSL inbound inspection technique or a SSL forward proxy technique. As shown by reference number 130, assume that the decryption profile indicates that the security device is to use the SSL inbound inspection technique to manage the encrypted traffic associated with the SSL/TLS session.

As shown by reference number 140, a SSL inbound inspection module of the security device may determine, based on the client cipher information included in the message, that the client device has indicated a preference to use a Diffie-Hellman key exchange to establish the SSL/TLS session. As shown by reference number 150, after determining that the client device has indicated the preference for use of the Diffie-Hellman key exchange, the security device may perform a server cipher preference cache lookup, using the server indicator, to determine whether the server device supports the use of Diffie-Hellman key exchanges to establish SSL/TLS sessions. In some implementations, the server cipher preference cache may include information indicating whether the server device supports Diffie-Hellman key exchanges, key exchange cipher priority information associated with the server device, or the like. For the purposes of example implementation 100, assume that the server cipher preference cache includes information indicating that the server device supports Diffie-Hellman key exchanges.

As shown by reference number 160, based on determining that the server device supports Diffie-Hellman key exchanges, the SSL inbound inspection module may hand over establishment and management of the SSL/TLS session to a SSL forward proxy module of the security device. As shown by reference number 170, the SSL forward proxy module may proceed with establishing the SSL/TLS session using the Diffie-Hellman key exchange (e.g., such that the security device may determine a session key in the manner described above), and may manage the encrypted traffic for the SSL/TLS session using the SSL forward proxy technique, accordingly.

In this way, a security device may determine whether a secure session is to be established using a Diffie-Hellman key exchange and, based on the determination, may identify a decryption technique to be used for establishing and managing the secure session. This may allow the security device to decrypt encrypted traffic following a Diffie-Hellman key exchange, even when the security device initially determines that the SSL/TLS session is to be managed using a SSL inbound inspection technique. Moreover, this may allow the SSL inbound inspection technique to be used when possible, thereby reducing an amount of computing resources consumed by the security device (e.g., since the security device may consume more computing resources during establishment of the SSL/TLS session using the SSL forward proxy technique as compared to the SSL inbound inspection technique).

Notably, while systems and/or methods described herein may be described in the context of using the SSL forward proxy technique or the SSL inbound inspection technique, in some implementations, one or more other decryption techniques may be used. For example, the systems and/or methods described herein may be applied to a set of decryption techniques that includes a first decryption technique that may be implemented when the client device or the server device does not support Diffie-Hellman key exchanges, and a second decryption technique that may be implemented when the client device and the server device support Diffie-Hellman key exchanges.

Additionally, while the systems and/or methods described herein may be described in the context of a SSL/TLS session, in some implementations, the systems and/or methods may be used in association with another type of secure session via which traffic, encrypted with a session key, is sent and/or received by a client device and/or a server device.

Figure 2:
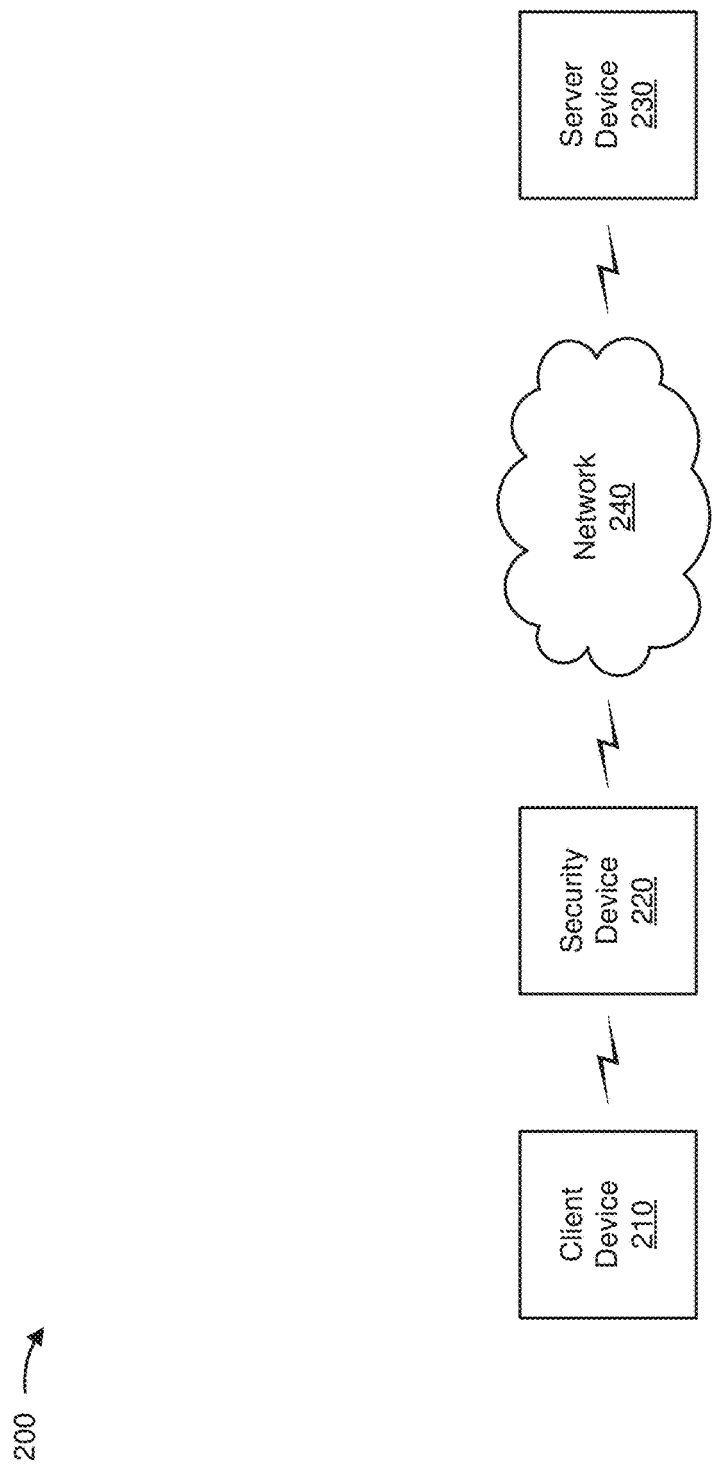
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a client device 210, a security device 220, a server device 230, and a network 240. Devices of environment 200 may interconnect via wired connections, wireless connections, or a combination of wired and wireless connections.

Client device 210 may include one or more devices capable of communicating with other devices, such as security device 220 and/or server device 230, via network

240. For example, client device 210 may include a computing device, such as a laptop computer, a tablet computer, a handheld computer, a desktop computer, a mobile phone (e.g., a smart phone, a radiotelephone, etc.), or a similar device. In some implementations, client device 210 may be capable of initiating a secure session with server device 230, such as a SSL/TLS session. In some implementations, client device 210 may be capable of participating in a Diffie-Hellman key exchange to establish the SSL/TLS session with server device 230.

Security device 220 may include one or more devices capable of managing, inspecting, processing, and/or monitoring, traffic provided by and/or destined for client device 210 and associated with a secure session between client device 210 and another device, such as a SSL/TLS session between client device 210 and server device 230. For example, security device 220 may include a computing device, such as a server device or a group of server devices. Additionally, or alternatively, security device 220 may be implemented within a cloud computing network using one or more virtual machines. In some implementations, security device 220 may host a firewall associated with client device 210 and/or may store or have access to a decryption profile associated with one or more firewall rules corresponding to the firewall.

In some implementations, security device 220 may be capable of using multiple, different decryption techniques to manage encrypted traffic associated with the SSL/TLS session, such as a SSL forward proxy technique, a SSL inbound inspection technique, or the like. Additionally, or alternatively, security device 220 may store or have access to a decryption profile associated with determining a decryption technique to be used to manage the encrypted traffic. In some implementations, security device 220 may store or have access to a server cipher preference cache associated with one or more server devices 230. Additional, details regarding security device 220 are described below with regard to FIG. 3.

In some implementations, security device 220 may include one or more devices capable of processing and/or transferring traffic associated with client device 210. For example, security device 220 may include a network device, such as a reverse proxy, a server (e.g., a proxy server), a traffic transfer device, a router, a load balancer, or the like.

In some implementations, security device 220 may be used in connection with a single client device 210 or a group of client devices 210 (e.g., included in a client network). Communications may be routed through security device 220 to reach client device(s) 210. For example, security device 220 may be positioned within a network as a gateway to a client network that includes one or more client devices 210. In some implementations, security device 220 may be used in connection with a single server device 230 or a group of server devices 230 (e.g., a data center). Communications may be routed through security device 220 to reach the one or more server devices 230. For example, security device 220 may be positioned within a network as a gateway to a private network that includes one or more server devices 230.

Server device 230 may include one or more devices capable of receiving, generating, storing, and/or providing traffic to and/or from security device 220 and/or client device 210. For example, server device 230 may include a computing device, such as a server (e.g., an application server, a content server, a host server, a web server, etc.) or a collection of servers. In some implementations, server device 230 may be capable of participating in a Diffie-Hellman key exchange to establish a SSL/TLS session with client device 210.

Network 240 may include one or more wired and/or wireless networks that allow client device 210 and/or server device 230 to communicate. For example, network 240 may include a local area network ("LAN"), a wide area network ("WAN"), a metropolitan area network ("MAN"), a telephone network (e.g., the Public Switched Telephone Network ("PSTN")), an ad hoc network, an intranet, the Internet, a fiber optic-based network, a private network, a cloud computing network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
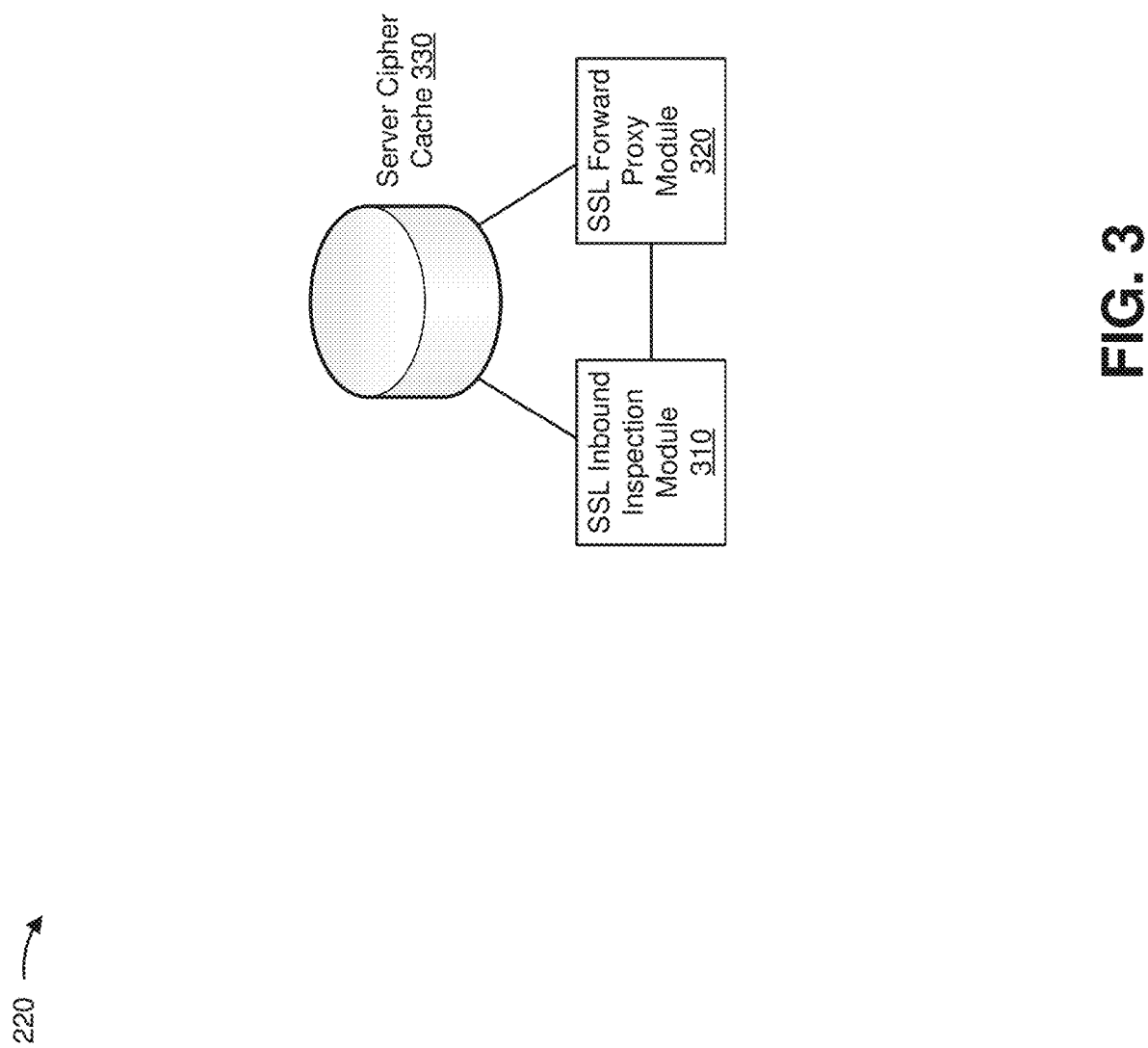
FIG. 3 is a diagram showing example functional components of the security device of FIG. 2.

FIG. 3 is a diagram of example functional components of security device 220. As shown in FIG. 3, security device 220 may include a SSL inbound inspection module 310, a SSL forward proxy module 320, and a server cipher preference cache 330.

SSL inbound inspection module 310 may perform operations associated with implementing the SSL inbound inspection technique to manage encrypted traffic associated with the SSL/TLS session. In some implementations, SSL inbound inspection module 310 may be capable of handing over management of the traffic associated with the SSL/TLS session to SSL forward proxy module 320 when, for example, a Diffie-Hellman key exchange is to be used to establish the SSL/TLS session. Additionally, or alternatively, SSL inbound inspection module 310 may include a transmission control protocol (TCP) reassemble module associated with ensuring that TCP segments are received in order.

SSL forward proxy module 320 may perform operations associated with implementing the SSL forward proxy technique to manage encrypted traffic associated with an SSL/TLS session. In some implementations, SSL forward proxy module 320 may be capable of receiving Diffie-Hellman parameters associated with a Diffie-Hellman key exchange between client device 210 and server device 230, such that security device 220 may generate and provide additional Diffie-Hellman parameters to enable SSL forward proxy module 320 to determine a session key in order to manage traffic associated with the SSL/TLS session, as described above. Additionally, or alternatively, SSL forward proxy module 320 may include a TCP proxy module since a TCP connection, associated with the SSL/TLS session, may be split into two portions.

Server cipher preference cache 330 may perform functions associated with storing server cipher preference information associated with server device 230, such as information that identifies one or more key exchange ciphers supported by server device 230, priority information associated with the one or more key exchange ciphers supported by server device 230, a server indicator associated with server device 230 (e.g., a hostname associated with server device 230, a domain name associated with server device 230, an IP address associated with server device 230, etc.), a virtual routing identifier corresponding server device 230, a logical system identifier corresponding to server device 230, or the like. In some implementations, server cipher preference cache 330 may be enabled or disabled based on a configuration of security device 220. In some implementations, server preference cipher cache 330 may located within security device 220. Additionally, or alternatively, server cipher preference cache 330 may be included in a device separate from security device 220, such as a device within a cloud computing network that may be accessed and/or updated by one or more security devices 220.

In some implementations, server cipher preference cache 330 may receive the server cipher preference information from SSL forward proxy module 320 and/or SSL inbound inspection module 310. For example, when SSL forward proxy module 320 is used to establish the SSL/TLS session, SSL forward proxy module 320 may receive, from server device 230, a message associated with initiating the SSL/TLS session, such as a server hello message that includes the server cipher preference information. Here, SSL forward proxy module 320 may provide the received server cipher preference information to server cipher preference cache 330, and server cipher preference cache 330 may store the server cipher preference information accordingly (e.g., server cipher preference cache may create an entry associated with the server cipher preference information based on a server common name included in the server certificate). Additionally, or alternatively, server cipher preference cache 330 may receive the server cipher preference information based on input provided by a user of security device 220.

In some implementations, server cipher preference cache 330 may receive modified and/or updated server cipher preference information associated with server device 230, and may overwrite, modify, update, and/or delete previous server cipher preference information (e.g., server cipher preference information received at an earlier time). For example, SSL inbound inspection module 310 may initially determine, based on information stored by server cipher preference cache 330, that server device 230 does not support Diffie-Hellman key exchanges. In this example, SSL inbound inspection module 310 may continue to follow messages, associated with a SSL handshake procedure for establishing the SSL/TLS session, and may determine, (e.g., based on a server hello message associated with the SSL handshake procedure) updated server cipher preference information that indicates that server device 230 supports Diffie-Hellman key exchanges (e.g., contrary to the initial determination). Here, SSL inbound inspection module 310 may provide the updated server cipher preference information to server cipher preference cache 330 for storage. In this example, SSL inbound inspection module 310 may also hand over establishment of the SSL/TLS session and/or management of the encrypted traffic to SSL forward proxy module 320.

The number and arrangement of functional components shown in FIG. 3 are provided as an example. In practice, security device 220 may include additional functional components, fewer functional components, different functional components, or differently arranged functional components than those shown in FIG. 3. Additionally, or alternatively, a set of functional components (e.g., one or more functional components) of security device 220 may perform one or more operations described as being performed by another set of functional components of security device 220.

Figure 4:
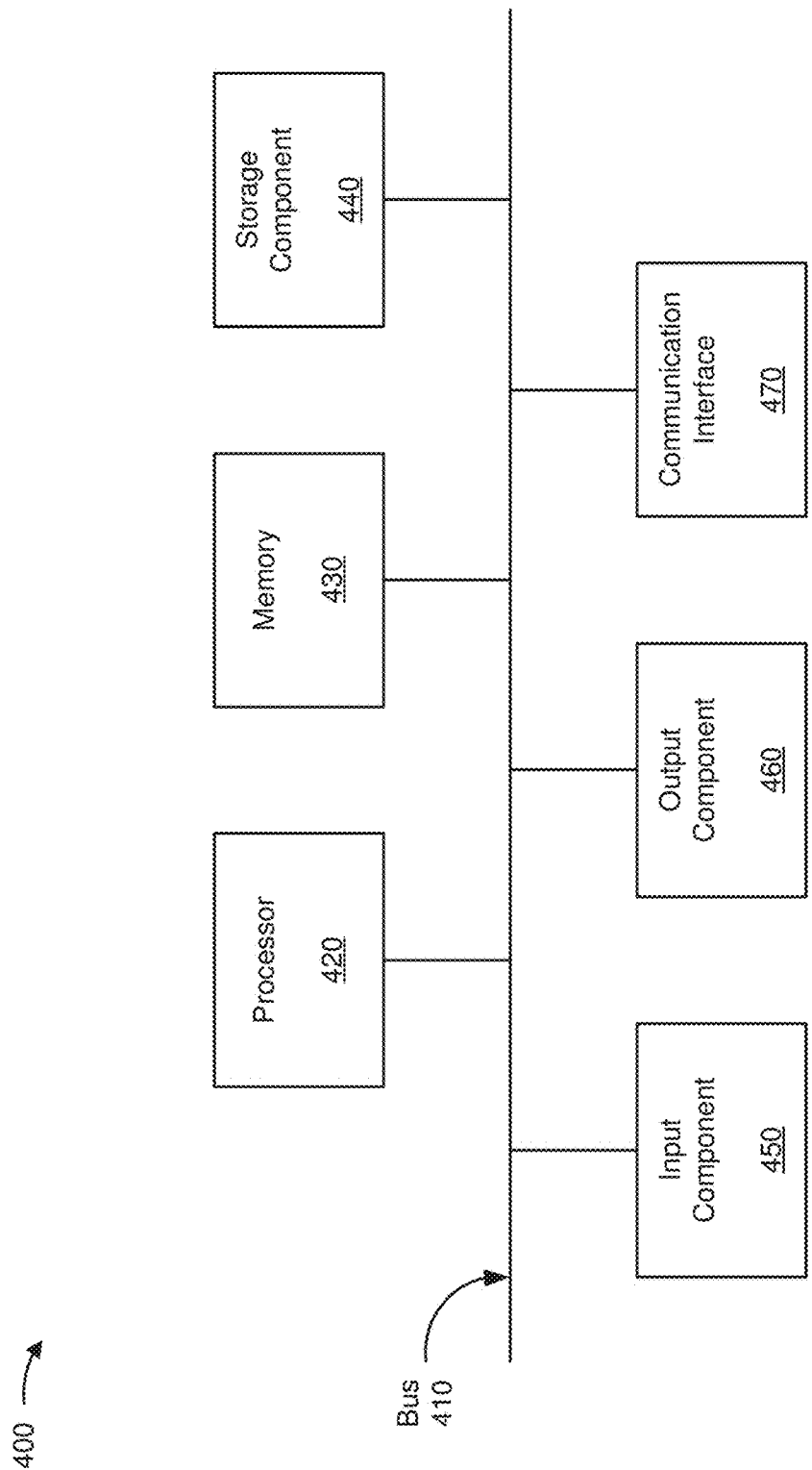
FIG. 4 is a diagram of example components of one or more devices of FIG. 2.

FIG. 4 is a diagram of example components of a device 400. Device 400 may correspond to client device 210, security device 220, server device 230, and/or server cipher preference cache 330. In some implementations, client device 210, security device 220, server device 230, and/or server cipher preference cache 330 may include one or more devices 400 and/or one or more components of device 400. As shown in FIG. 3, device 400 may include a bus 410, a processor 420, a memory 430, a storage component 440, an input component 450, an output component 460, and a communication interface 470.

Bus 410 may include a component that permits communication among the components of device 400. Processor 420 is implemented in hardware, firmware, or a combination of hardware and software. Processor 420 may include one or more processors (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that can be programmed to perform a function. Memory 430 may include a random access memory (RAM), a read only memory (ROM), and/or another type of dynamic or static storage device (e.g., a flash memory, a magnetic memory, an optical memory, etc.) that stores information and/or instructions for use by processor 420.

Storage component 440 may store information and/or software related to the operation and use of device 400. For example, storage component 440 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 450 may include a component that permits device 400 to receive information, such as via user input (e.g., a touch screen display, a keyboard, a keypad, a mouse, a button, a switch, a microphone, etc.). Additionally, or alternatively, input component 450 may include a sensor for sensing information (e.g., a global positioning system (GPS) component, an accelerometer, a gyroscope, an actuator, etc.). Output component 460 may include a component that provides output information from device 400 (e.g., a display, a speaker, one or more light-emitting diodes (LEDs), etc.).

Communication interface 470 may include a transceiver-like component (e.g., a transceiver, a separate receiver and transmitter, etc.) that enables device 400 to communicate with other devices, such as via a wired connection, a wireless connection, or a combination of wired and wireless connections. Communication interface 470 may permit device 400 to receive information from another device and/or provide information to another device. For example, communication interface 470 may include an Ethernet interface, an optical interface, a coaxial interface, an infrared interface, a radio frequency (RF) interface, a universal serial bus (USB) interface, a Wi-Fi interface, a cellular network interface, or the like.

Device 400 may perform one or more processes described herein. Device 400 may perform these processes in response to processor 420 executing software instructions stored by a computer-readable medium, such as memory 430 and/or storage component 440. A computer-readable medium is defined herein as a non-transitory memory device. A memory device includes memory space within a single physical storage device or memory space spread across multiple physical storage devices.

Software instructions may be read into memory 430 and/or storage component 440 from another computer-readable medium or from another device via communication interface 470. When executed, software instructions stored in memory 430 and/or storage component 440 may cause processor 420 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
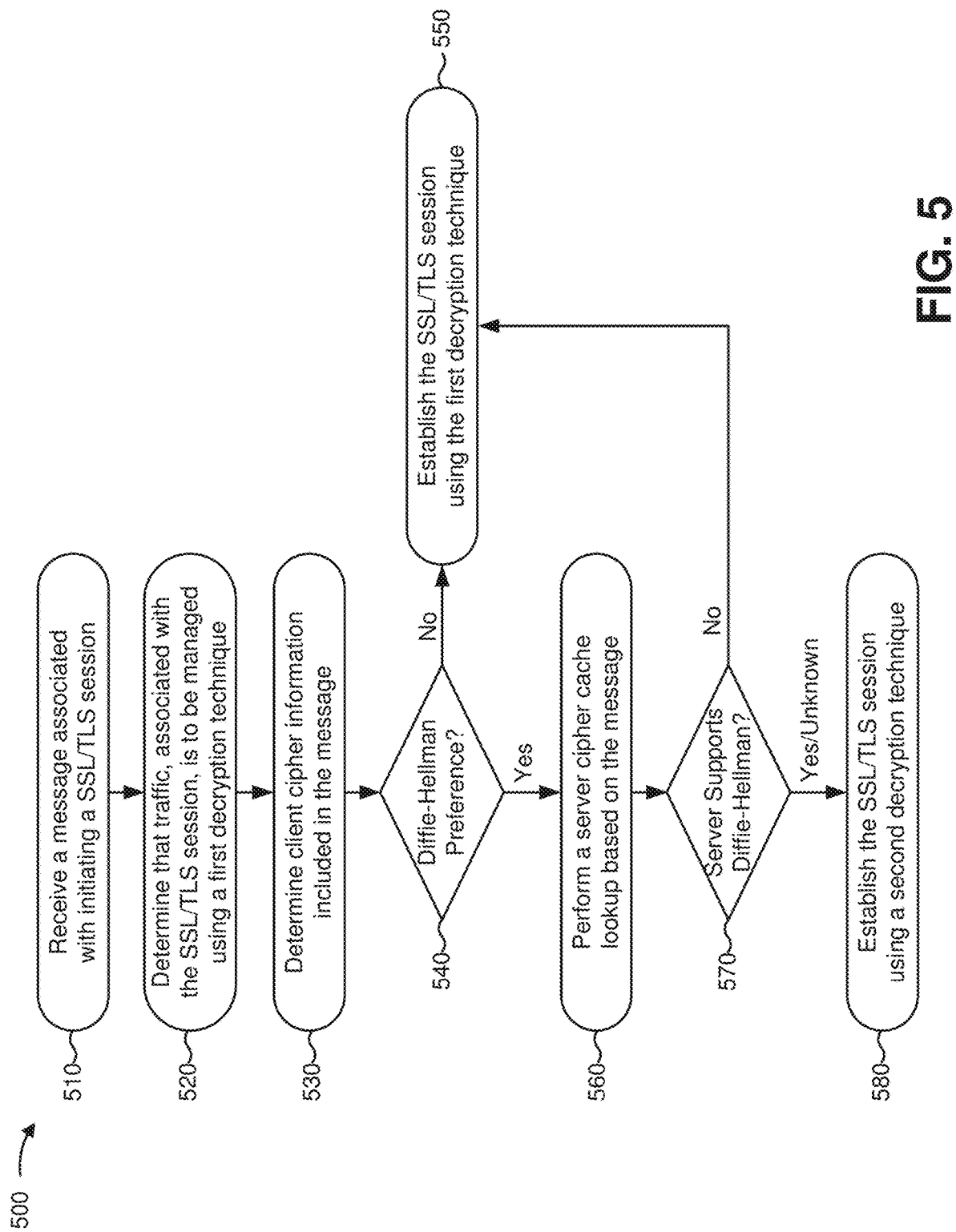
FIG. 5 is a flow chart of an example process for determining whether a Diffie-Hellman key exchange may be used to establish a secure session, and establishing the secure session accordingly.

FIG. 5 is a flow chart of an example process 500 for determining whether a Diffie-Hellman key exchange may be used to establish a secure session, and establishing the secure session accordingly. In some implementations, one or more process blocks of FIG. 5 may be performed by security device 220. In some implementations, one or more process blocks of FIG. 5 may be performed by another device, or a group of devices separate from or including security device 220, such as client device 210.

As shown in FIG. 5, process 500 may include receiving a message associated with initiating a SSL/TLS session (block 510). For example, security device 220 may receive a message associated with initiating a SSL/TLS session. In some implementations, security device 220 may receive the message when another device provides the message, such as when client device 210 provides the message.

The message may include a message associated with initiating a SSL/TLS session via which client device 210 and server device 230 may securely exchange information. For example, the message may include a client hello message associated with initiating a SSL/TLS session between client device 210 and server device 230.

In some implementations, the message may include client cipher information associated with initiating the SSL/TLS session. The client cipher information may include information that identifies one or more key exchange ciphers, supported by client device 210, that may be used to establish the SSL/TLS session, such as a RSA key exchange, a Diffie-Hellman key exchange, an elliptic curve Diffie-Hellman key exchange, or the like. Additionally, or alternatively, the client cipher information may include priority information associated with the one or more key exchange ciphers. The priority information may include, for example, information that identifies an order of priority associated with the one or more key exchange ciphers (e.g., when client device 210 supports multiple key exchange ciphers). For example, the client cipher information may include priority information indicating that a first priority key exchange cipher for client device 210 is an elliptic curve Diffie-Hellman key exchange, that a second priority key exchange cipher for client device 210 is a Diffie-Hellman key exchange, and that a third priority key exchange cipher for client device 210 is a RSA key exchange. Additionally, or alternatively, the client cipher information may include other information, such as information that identifies one or more authentication, encryption, and/or message authentication code (MAC) algorithms associated with establishing the SSL/TLS session.

In some implementations, the message may include a server indicator associated with server device 230. For example, if the message is a client hello message that conforms with transport layer security (TLS) 1.0 standard or higher, the message may include a server name indication (SNI) extension that identifies a host name associated with server device 230, such as a domain name, a network address, or the like. TLS protocol and SSL protocol (discussed below) may include cryptographic protocols designed to provide communications security over a computer network. Additionally, or alternatively, the message may include other information associated with initiating the SSL/TLS session.

In some implementations, security device 220 may receive the message based on a inspecting a packet associated with the message. For example, security device 220 may be positioned between client device 210 and network 240, and may be configured to inspect (e.g., using a deep packet inspection (DPI) technique) packets provided by client device 210. Here, security device 220 may, based on inspecting a packet associated with the message, determine that the packet includes the message, and analyze the message when, for example, security device 220 is configured to analyze messages associated with initiating SSL/TLS sessions.

Additionally, or alternatively, security device 220 may receive and/or determine information for identifying a firewall rule (and an associated decryption profile) that is to be used to manage traffic associated with the SSL/TLS session. For example, security device 220 may receive and/or determine (e.g., based on the packet associated with the message) a source Internet protocol (IP) address, a destination IP address, a source port, a destination port, a transport layer protocol, or the like, and may use some or all of this information to identify a decryption profile associated with the SSL/TLS session, as described below.

As further shown in FIG. 5, process 500 may include determining that traffic, associated with the SSL/TLS session, is to be managed using a first decryption technique (block 520). For example, security device 220 may determine that the traffic, associated with the SSL/TLS session, is to be managed using the first decryption technique. In some implementations, security device 220 may determine that the traffic is to be managed using the first decryption technique after security device 220 receives the message associated with the SSL/TLS session. Additionally, or alternatively, security device 220 may determine that the traffic is to be managed using the first decryption technique after security device 220 identifies a decryption profile associated with the message, as described below.

In some implementations, security device 220 may determine that the traffic is to be managed using the first decryption technique based on a decryption profile associated with the SSL/TLS session. The decryption profile may include information associated with managing, inspecting, processing, and/or monitoring encrypted traffic associated with a secure session. For example, the decryption profile may include information that identifies a decryption technique to be used to establish the SSL/TLS session and/or manage the encrypted traffic, such as the SSL inbound inspection technique or the SSL forward proxy technique.

In some implementations, the decryption profile may be associated with one or more firewall rules. For example, the decryption profile may be associated with multiple firewall rules (e.g., such that the decryption profile is used when any of the multiple firewall rules are applied). As such, in some implementations, security device 220 may identify the decryption technique based on identifying a firewall rule. For example, as described above, assume that security device 220 determines, based on a packet associated with the message, a source IP address, a destination IP address, a source port, a destination port, a transport layer protocol, or the like. Here, security device 220 may, based on one or more of these items of information, identify a firewall rule to be applied when managing, inspecting, processing, and/or monitoring traffic associated with client device 210. In this example, security device 220 may also store information that identifies a decryption profile with which the firewall rule is associated. Here, security device 220 may identify the decryption profile as the decryption profile corresponding to the firewall rule, and may determine that the SSL inbound inspection technique is to be used when indicated as such by the decryption profile.

In some implementations, the first decryption technique may include a decryption technique to be used to establish the SSL/TLS session and/or manage the encrypted traffic when a Diffie-Hellman key exchange is not used to establish the SSL/TLS session. In other words, the first decryption technique may include a decryption technique to be used when security device 220 need not determine a session key, associated with the SSL/TLS session, associated with a Diffie-Hellman key exchange. For example, the first decryption technique may include the SSL inbound inspection technique that causes security device 220 to determine the session key during a RSA key exchange, and decrypt and inspect traffic without acting as a man-in-the-middle between client device 210 and server device 230, as described above. In some implementations, the first decryption technique may be used when security device 220 stores or has access to a server certificate and a server private key associated with server device 230 (e.g., such that security device 220 may determine the session key during a RSA key exchange). In some implementations, use of the first decryption technique may consume fewer computing resources than a second decryption technique (e.g., the SSL forward proxy technique). As such, it may be desirable to use the first decryption technique when possible.

As further shown in FIG. 5, process 500 may include determining client cipher information included in the message (block 530). For example, security device 220 may determine client cipher information included in the message. In some implementations, security device 220 may determine the client cipher information after security device 220 receives the message. Additionally, or alternatively, security device 220 may determines the client cipher information after security device 220 determines that the encrypted traffic is to be managed using the first decryption technique.

As described above, in some implementations, the client cipher information may include information that identifies one or more key exchange ciphers, supported by client device 210, that may be used to establish the SSL/TLS session (e.g., a RSA key exchange, a Diffie-Hellman key exchange, an elliptic curve Diffie-Hellman key exchange, etc.), priority information associated with the one or more key exchange ciphers, or the like.

As further shown in FIG. 5, process 500 may include determining whether the client cipher information indicates a preference for using a Diffie-Hellman key exchange to establish the SSL/TLS session (block 540). For example, security device 220 may determine whether the client cipher information indicates a preference for using a Diffie-Hellman key exchange to establish the SSL/TLS session. In some implementations, security device 220 may determine whether the client cipher information indicates a preference for using a Diffie-Hellman key exchange after security device 220 determines the client cipher information. Additionally, or alternatively, security device 220 may determine whether the client cipher information indicates a preference for using a Diffie-Hellman key exchange after security device 220 determines that the first decryption technique is to be used to manage the encrypted traffic associated with the SSL/TLS session.

In some implementations, security device 220 may determine whether the client cipher information indicates a preference for using a Diffie-Hellman key exchange based on the client cipher information. For example, the client cipher information may identify a set of key exchange ciphers, supported by client device 210, that includes a Diffie-Hellman key exchange and a RSA key exchange. In this example, the client cipher information may also indicate that the Diffie-Hellman key exchange has a high priority (e.g., a level one priority, a first priority, etc.) and that the RSA key exchange has a low priority (e.g., a level two priority, a second priority, etc.). In this example, security device 220 may determine that client cipher information indicates a preference for using a Diffie-Hellman key exchange since the Diffie-Hellman key exchange cipher has a higher priority than the RSA cipher.

As another example, security device 220 may determine that the client cipher information does not indicate a preference for using a Diffie-Hellman key exchange to establish the SSL/TLS session (e.g., when client device 210 does not support a Diffie-Hellman key exchange, when client device 210 supports only RSA key exchanges, etc.) and/or may determine that another type of key exchange cipher has a higher priority than the Diffie-Hellman key exchange cipher. Here, security device 220 may determine that the client cipher information does not indicate a preference for using a Diffie-Hellman key exchange during establishment of the SSL/TLS session.

As further shown in FIG. 5, if the client cipher information does not indicate a preference for using a Diffie-Hellman key exchange (block 540—NO), then process 500 may include establishing the SSL/TLS session using the first decryption technique (block 550). For example, security device 220 may determine that the client cipher information does not indicate a preference for using a Diffie-Hellman key exchange to establish the SSL/TLS session, and security device 220 may establish the SSL/TLS session using the first decryption technique.

As described above, in some implementations, the first decryption technique may include a decryption technique to be used to establish the SSL/TLS session and/or manage the encrypted traffic when a Diffie-Hellman key exchange is not used to establish the SSL/TLS session, such as the SSL inbound inspection technique to be used when security device 220 stores or has access to a server certificate and a server private key associated with server device 230. For example, the SSL inbound inspection technique may be used when a RSA key exchange is used to establish the SSL/TLS session (e.g., since security device 220 may store or have access to a server private key and, thus, may decrypt the session key associated with the SSL/TLS session).

In some implementations, an amount of computing resources consumed by security device 220 when using the SSL inbound inspection technique may be less than an amount of computing resources consumed by security device 220 when using the SSL forward proxy technique. As such, an amount of computing resources consumed by security device 220 may be reduced in a case when security device 220 determines that the client cipher information does not indicate a preference for using a Diffie-Hellman key exchange and subsequently establishes the SSL/TLS session using the SSL inbound inspection technique. Moreover, use of the SSL inbound inspection technique may result in increased SSL decryption throughput due to a reduced amount of processing time associated with using the SSL inbound inspection technique.

As further shown in FIG. 5, if the client cipher information indicates a preference for using a Diffie-Hellman key exchange (block 540—YES), then process 500 may include performing a server cipher preference cache lookup based on the message (block 560). For example, security device 220 may determine that the client cipher information indicates a preference for using a Diffie-Hellman key exchange to establish the SSL/TLS session, and security device 220 may perform a server cipher preference cache lookup based on the message. In some implementations, security device 220 may perform the server cipher preference cache lookup after security device 220 determines that the client cipher information indicates a preference for a Diffie-Hellman key exchange.

In some implementations, security device 220 may perform the server cipher preference cache lookup to determine server cipher preference information associated with server device 230. The server cipher preference information may include information that identifies one or more key exchange ciphers supported by server device 230 that may be used to establish the SSL/TLS session, such as a RSA key exchange, a Diffie-Hellman key exchange, an elliptic curve Diffie-Hellman key exchange, or the like. In some implementations, the server cipher preference information may include priority information associated with the one or more key exchange ciphers supported by server device 230.

In some implementations, security device 220 may perform the server cipher preference cache lookup based on information included in the message. For example, security device 220 may perform the server cipher preference cache lookup based on the server indicator included in the message, such as a hostname associated with server device 230 (e.g., when security device 220 is configured to determine the hostname from a TLS SNI extension included in a client hello message). Here, security device 220 may perform the server cipher preference cache lookup, based on the server indicator, to determine whether server cipher preference cache 330 includes an entry, associated with identifying server device 230, that matches the server indicator, such as an entry that includes a server common name that matches the server indicator and server cipher preference information corresponding to the server common name.

In some cases, security device 220 may be capable of performing the server cipher preference cache lookup in a virtual hosting scenario and/or a domain name system (DNS) round robin scenario. For example, since security device 220 may perform the server cipher preference cache lookup based on the server indicator (e.g., rather than an IP address associated with the message), a virtual hosting scenario and/or a DNS round robin scenario that causes multiple, different IP addresses to be associated with a server indicator may not prevent security device 220 from performing the server cipher preference cache lookup.

As still another example, security device 220 may perform the server cipher preference cache lookup based on other information associated with the message. For example, security device 220 may perform the server cipher preference cache lookup based on information associated with the message, such as a destination IP address, a destination port, a virtual routing identifier, a logical system identifier, or the like.

In some implementations, a result of the server cipher preference cache lookup may include server cipher preference information associated with the server device 230. For example, security device 220 may determine server cipher preference information, associated with server device 230 and based on performing the server cipher preference cache lookup, that identifies a set of key exchange ciphers supported by server device 230. Alternatively, the result of the server cipher preference cache lookup may indicate that server cipher preference cache 330 does not store server cipher preference information associated with server device 230.

As further shown in FIG. 5, process 500 may include determining, based on a result of the server cipher preference cache lookup, whether a server device, associated with the SSL/TLS session, supports use of a Diffie-Hellman key exchange to establish the SSL/TLS session (block 570). For example, security device 220 may determine, based on the result of the server cipher preference cache lookup, whether server device 230 supports use of a Diffie-Hellman key exchange to establish the SSL/TLS session.

In some implementations, security device 220 may determine whether server device 230 supports a Diffie-Hellman key exchange based on the server cipher preference information determined as a result of performing the server cipher preference cache lookup. For example, security device 220 may determine, based on the server cipher preference information, that server device 230 supports a Diffie-Hellman key exchange. As another example, security device 220 may determine, based on the server cipher preference information, that server device 230 does not support a Diffie-Hellman key exchange (e.g., when server device 230 is not configured to support elliptic curve Diffie-Hellman key exchanges and/or Diffie-Hellman key exchanges, when server device 230 supports use of RSA key exchanges only, when server device 230 prefers use of RSA key exchanges over the use of Diffie-Hellman key exchanges, etc.).

Additionally, or alternatively, security device 220 may be unable to determine whether server device 230 supports use of a Diffie-Hellman key exchange based on the result of performing the server cipher preference cache lookup. For example, security device 220 may determine, based on performing the server cipher preference cache lookup, that server cipher preference cache 330 does not store server cipher preference information associated with server device 230, and security device 220 may be unable to determine whether server device 230 supports a Diffie-Hellman key exchange.

As further shown in FIG. 5, if the server device, associated with the SSL/TLS session, does not support use a Diffie-Hellman key exchange (block 570—NO), then process 500 may include establishing the SSL/TLS session using the first decryption technique (block 550). For example, security device 220 may determine that the server device, associated with the SSL/TLS session, does not support use of a Diffie-Hellman key exchange to establish the SSL/TLS session, and security device 220 may establish the SSL/TLS session using the first decryption technique, as described above with regard to block 550.

As further shown in FIG. 5, if the server device, associated with the SSL/TLS session, supports use a Diffie-Hellman key exchange, or if it is unknown whether the server device supports use of a Diffie-Hellman key exchange (block 570—YES/UNKNOWN), then process 500 may include establishing the SSL/TLS session using a second decryption technique (block 580). For example, security device 220 may determine that server device 230, associated with the SSL/TLS session, supports use of a Diffie-Hellman key exchange to establish the SSL/TLS session, and security device 220 may establish the SSL/TLS session using the second decryption technique. As another example, security device 220 may be unable to determine whether server device 230, associated with the SSL/TLS session, supports use of a Diffie-Hellman key exchange, and security device 220 may establish the SSL/TLS session using the second decryption technique.

The second decryption technique may include a decryption technique to be used to establish the SSL/TLS session and/or manage the encrypted traffic when a Diffie-Hellman key exchange may be used to establish the SSL/TLS session. In other words, the second decryption technique may include a decryption technique to be used when security device 220 may need to intervene in a Diffie-Hellman key exchange in order to determine a session key associated with the SSL/TLS session, in the manner described above. For example, the second decryption technique may include the SSL forward proxy technique that causes security device 220 to create two Diffie-Hellman key exchanges associated with establishing the SSL/TLS session, as described above. By acting as a man-in-the-middle between client device 210 and server device 230 during the Diffie-Hellman key exchange, security device 220 may be capable of determining the session key, which may allow security device 220 to manage encrypted traffic associated with the SSL/TLS session.

By intelligently determining when the second decryption technique is to be used based on whether the SSL/TLS session may be established using a Diffie-Hellman key exchange, security device 220 may be capable of managing the encrypted traffic, associated with a SSL/TLS session, even when a Diffie-Hellman key exchange is used to establish the SSL/TLS session, rather than dropping the SSL/TLS session or allowing the traffic to pass security device 220 without being inspected.

In some implementations, security device 220 may establish the SSL/TLS session using the determined decryption technique, and may update server cipher preference cache 330 based on information received during establishment of the SSL/TLS session. For example, assume that security device 220 determines that server cipher preference cache 330 does not store server cipher preference information associated with server device 230, and that the SSL/TLS session is established using the SSL forward proxy technique. Here, security device 220 may receive (e.g., in a server hello message provided by server device 230) server cipher preference information, associated with establishing the SSL/TLS session, indicating that server device 230 does not support use of Diffie-Hellman key exchanges, and may update server cipher preference cache 330 accordingly. As such, for a next SSL/TLS session with server device 230, security device 220 may be capable of determining that server device 230 does not support use of Diffie-Hellman key exchanges, and may use the SSL inbound inspection technique to establish the SSL/TLS session in the manner described above.

Additionally, or alternatively, server cipher preference information, received from server device 230 during establishment of the SSL/TLS session may differ from the server cipher preference information stored by server cipher preference cache. For example, assume that security device 220 determines that the SSL inbound inspection technique is to be used to establish the SSL and manage the traffic associated with the SSL/TLS session. Further, assume that security device 220 receives, during establishment of the SSL/TLS session, a server hello message that includes server cipher preference information indicating that server device 230 supports and/or prefers the use of a Diffie-Hellman key exchange to establish the SSL/TLS session. In this example, SSL inbound inspection module 310 may hand over establishment of the SSL/TLS session to SSL forward proxy module 320, and SSL forward proxy module 320 may generate its own server hello message with Diffie-Hellman parameters for provision to client device 210. Here, SSL forward proxy module 320 may use server generated Diffie-Hellman parameters (e.g., provided in the server hello message) for the Diffie-Hellman key exchange with server device 230, and may proceed with establishing the SSL/TLS session using the SSL forward proxy technique, as described above.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
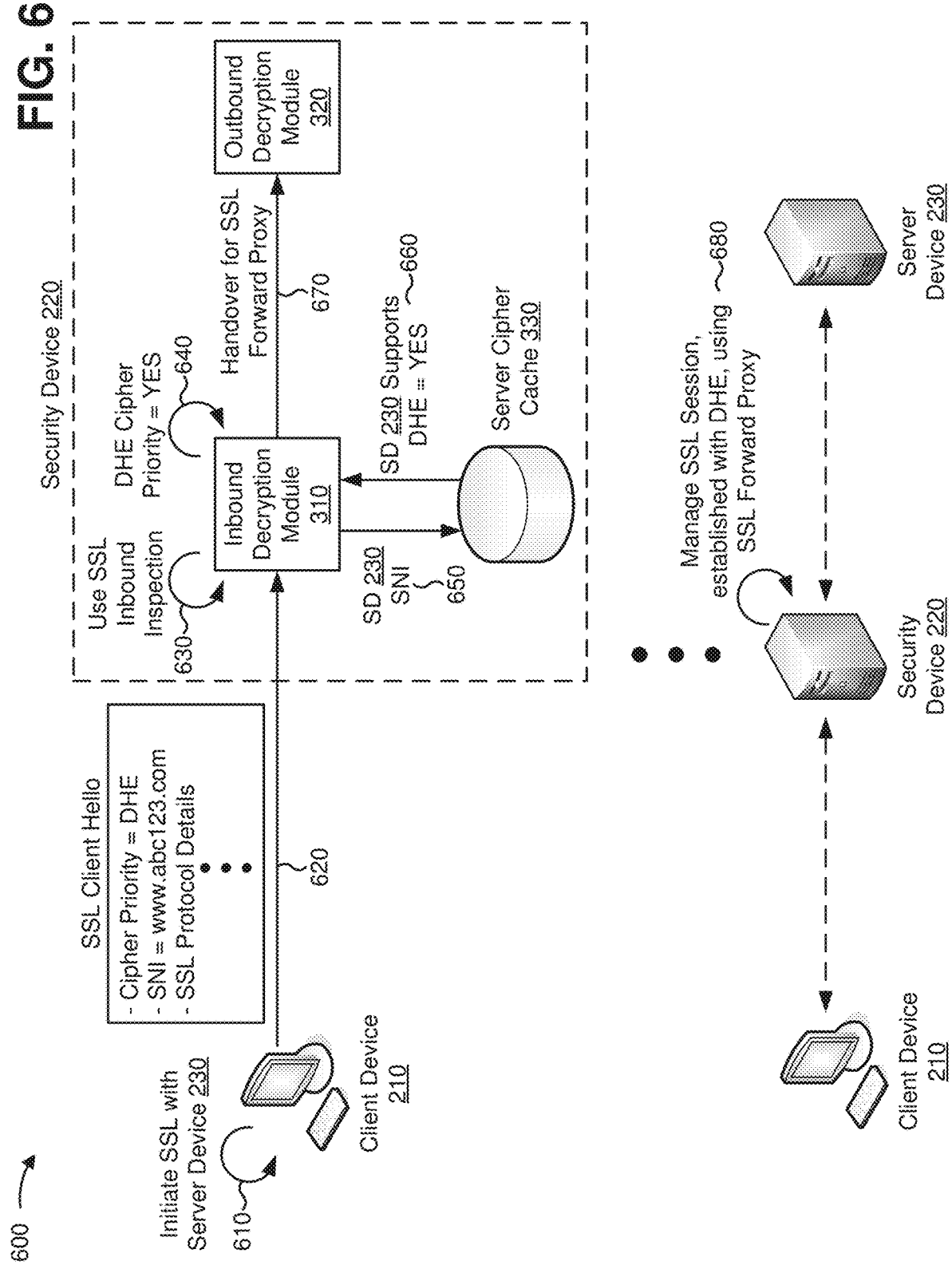
FIG. 6 is a diagram of an example implementation relating to the example process shown in FIG. 5.

FIG. 6 is a diagram of an example implementation 600 relating to example process 500 shown in FIG. 5. For the purposes of example implementation 600, assume that security device 220 is positioned between client device 210 and server device 230, and that security device 220 hosts a firewall associated with managing, inspecting, processing, monitoring, or the like, traffic provided by and/or destined for client device 210.

As shown in FIG. 6, and by reference number 610, client device 210 may receive an indication to initiate a SSL/TLS session with server device 230. As shown by reference number 620, client device 210 may provide a SSL client hello message associated with initiating the SSL/TLS session with server device 230. As shown, the SSL client hello message may include client cipher information identifying a Diffie-Hellman key exchange cipher as a preferred cipher associated with establishing the SSL/TLS session, a SNI associated with server device 230, and other information associated with establishing the SSL/TLS session.

For the purposes of FIG. 6, assume that security device 220 is configured to inspect traffic provided by client device 210, and analyze messages associated with initiating SSL/TLS sessions provided by client device 210. After analyzing the client hello message, security device 220 may (e.g., based on information included in a packet associated with the message) identify a firewall rule, and may determine a decryption profile associated with the firewall rule. As shown by reference number 630, assume that the decryption profile indicates that security device 220 is to use SSL inbound inspection to manage traffic for the SSL/TLS session initiated by client device 210.

As shown by reference number 640, SSL inbound inspection module 310 may determine, based on the client cipher information included in the client hello message, that client device 210 has indicated a preference to use a Diffie-Hellman key exchange to establish the SSL/TLS session. As shown by reference number 650, after determining that client device 210 has indicated the preference for the Diffie-Hellman key exchange, security device 220 may perform a server cipher preference cache lookup using the server indicator included in the client hello message. As shown by reference number 660, a result of the server cipher preference cache lookup may indicate that server device 230 supports use of Diffie-Hellman key exchanges to establish SSL/TLS sessions. As shown by reference number 670, based on determining that server device 230 supports a Diffie-Hellman key exchange, SSL inbound inspection module 310 may hand over establishment of the SSL/TLS session and management of encrypted traffic, associated with the SSL/TLS session, to SSL forward proxy module 320 in order to allow SSL forward proxy module 320 to establish the SSL/TLS session using the SSL forward proxy technique. As shown by reference number 680, SSL forward proxy module 320 may proceed with establishing the SSL/TLS session in the manner described above, and may subsequently manage the encrypted traffic for the SSL/TLS session using the SSL forward proxy technique (e.g., after determining a session key associated with the SSL/TLS session due to implementing the SSL forward proxy technique to intervene in the Diffie-Hellman key exchange).

As indicated above, FIG. 6 is provided merely as an example. Other examples are possible and may differ from what was described with regard to FIG. 6.

Figure 7:
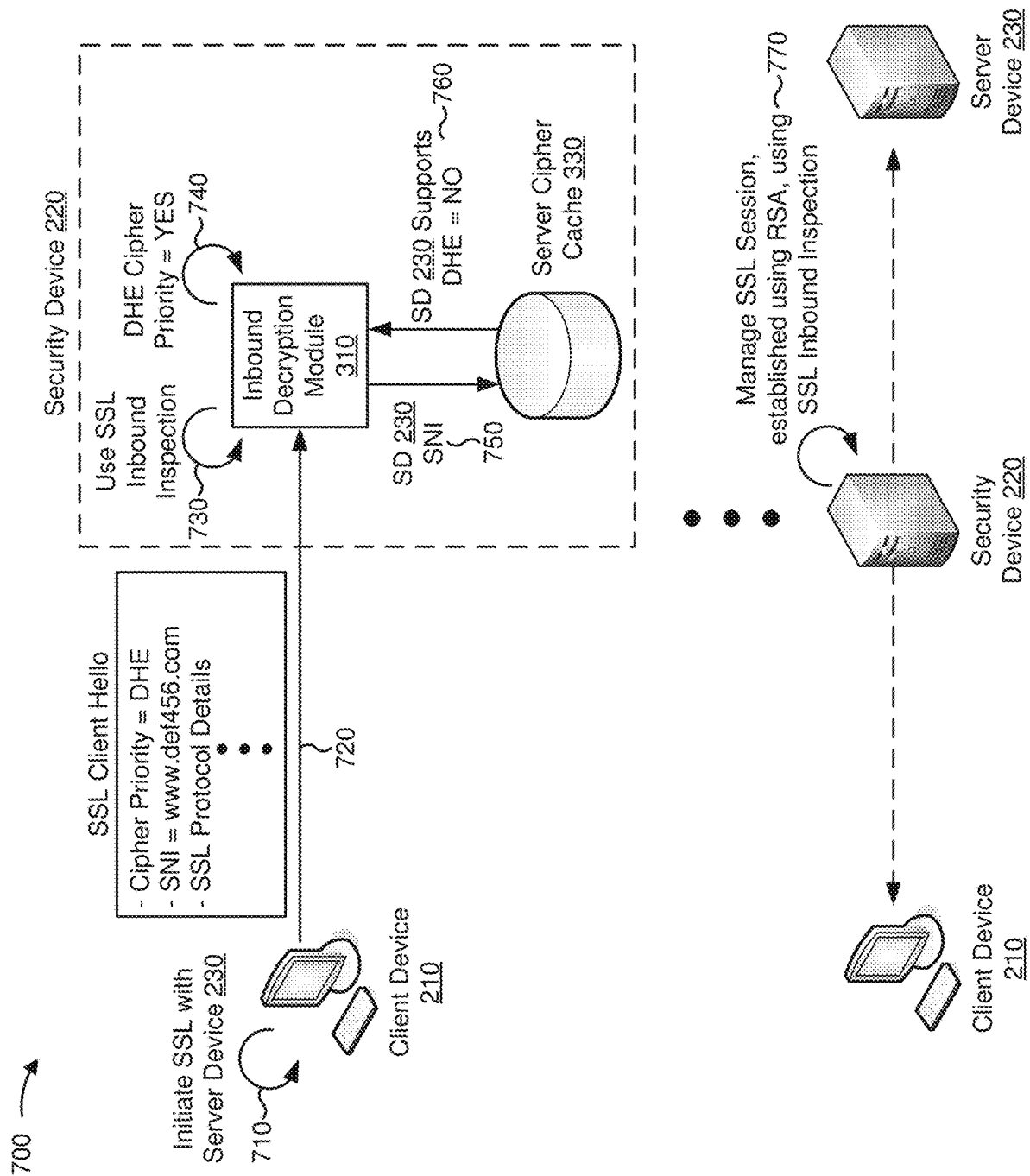
FIG. 7 is a diagram of an additional example implementation relating to the example process shown in FIG. 5.

FIG. 7 is a diagram of an additional example implementation 700 relating to example process 500 shown in FIG. 5. For the purposes of example implementation 700, assume that security device 220 is positioned between client device 210 and server device 230, and that security device 220 hosts a firewall associated with managing, inspecting, processing, monitoring, or the like, traffic provided by and/or destined for client device 210.

As shown in FIG. 7, and by reference number 710, client device 210 may receive an indication to initiate a SSL/TLS session with server device 230. As shown by reference number 720, client device 210 may provide a SSL client hello message associated with initiating the SSL/TLS session with server device 230. As shown, the SSL client hello message may include client cipher information identifying a Diffie-Hellman key exchange cipher as a preferred cipher associated with establishing the SSL/TLS session, a SNI associated with server device 230, and other information associated with establishing the SSL/TLS session.

For the purposes of FIG. 7, assume that security device 220 is configured to inspect traffic provided by client device 210, and analyze messages associated with initiating SSL/TLS sessions provided by client device 210. After analyzing the client hello message, security device 220 may (e.g., based on information included in a packet associated with the message) identify a firewall rule, and may determine a decryption profile associated with the firewall rule. As shown by reference number 730, assume that the decryption profile indicates that security device 220 is to use SSL inbound inspection to establish the SSL/TLS session and manage encrypted traffic associated with the SSL/TLS session initiated by client device 210.

As shown by reference number 740, SSL inbound inspection module 310 may determine, based on the client cipher information included in the client hello message, that client device 210 has indicated a preference to use a Diffie-Hellman key exchange to establish the SSL/TLS session. As shown by reference number 750, after determining that client device 210 has indicated the preference for the Diffie-Hellman key exchange, security device 220 may perform a server cipher preference cache lookup using the server indicator included in the client hello message. As shown by reference number 760, a result of the server cipher preference cache lookup may indicate that server device 230 does not support use of a Diffie-Hellman key exchange to establish SSL/TLS sessions (e.g., that server device 230 prefers RSA key exchanges, that server device 230 supports RSA key exchanges only). As shown by reference number 770, based on determining that server device 230 does not support use a Diffie-Hellman key exchange and, as shown by reference number 780, SSL inbound inspection module 310 may proceed with establishing the SSL/TLS session (e.g., using a RSA key exchange, a server certificate associated with server device 230, a server private key associated with server device 230, etc.). SSL inbound inspection module 310 may proceed with managing the SSL/TLS session using the SSL inbound inspection technique after the SSL/TLS session is established.

As indicated above, FIG. 7 is provided merely as an example. Other examples are possible and may differ from what was described with regard to FIG. 7.

Figure 8:
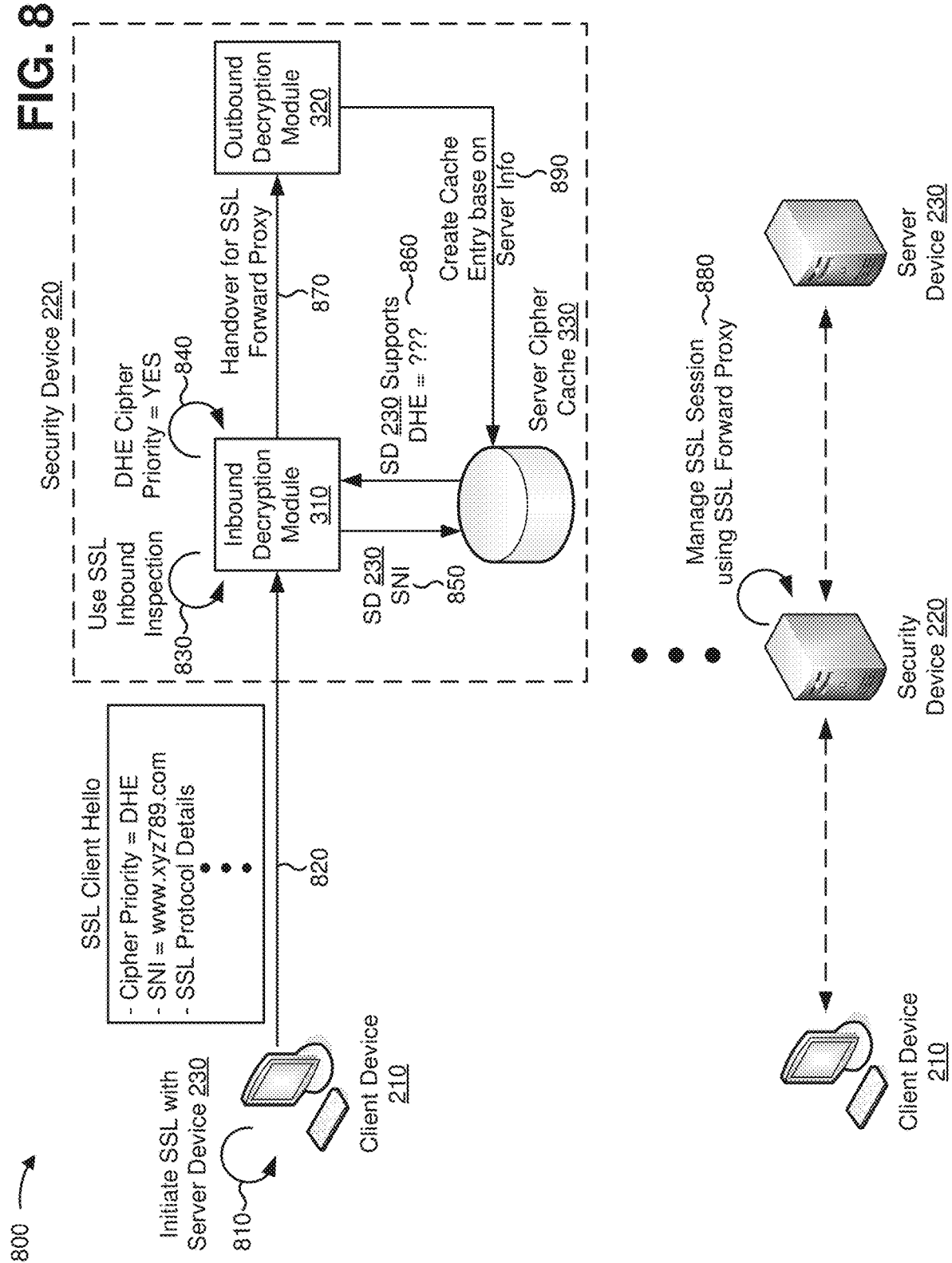
FIG. 8 is a diagram of another example implementation relating to the example process shown in FIG. 5.

FIG. 8 is a diagram of an additional example implementation 800 relating to example process 500 shown in FIG. 5. For the purposes of example implementation 800, assume that security device 220 is positioned between client device 210 and server device 230, and that security device 220 hosts a firewall associated with managing, inspecting, processing, monitoring, or the like, traffic provided by and/or destined for client device 210.

As shown in FIG. 8, and by reference number 810, client device 210 may receive an indication to initiate a SSL/TLS session with server device 230. As shown by reference number 820, client device 210 may provide a SSL client hello message associated with initiating the SSL/TLS session with server device 230. As shown, the SSL client hello message may include client cipher information identifying a Diffie-Hellman key exchange cipher as a preferred cipher associated with establishing the SSL/TLS session, a SNI associated with server device 230, and other information associated with establishing the SSL/TLS session.

For the purposes of FIG. 8, assume that security device 220 is configured to inspect traffic provided by client device 210, and analyze messages associated with initiating SSL/TLS sessions provided by client device 210. After analyzing the client hello message, security device 220 may (e.g., based on information included in a packet associated with the message) identify a firewall rule, and may determine a decryption profile associated with the firewall rule. As shown by reference number 830, assume that the decryption profile indicates that security device 220 is to use SSL inbound inspection to manage traffic for the SSL/TLS session initiated by client device 210.

As shown by reference number 840, SSL inbound inspection module 310 may determine, based on the client cipher information included in the client hello message, that client device 210 has indicated a preference to use a Diffie-Hellman key exchange to establish the SSL/TLS session. As shown by reference number 850, after determining that client device 210 has indicated the preference for the Diffie-Hellman key exchange, security device 220 may perform a server cipher preference cache lookup using the server indicator included in the client hello message. As shown by reference number 860, a result of the server cipher preference cache lookup may indicate that security device 220 does not store or have access to server cipher preference information associated with server device 230 (i.e., that it is unknown whether server device 230 supports use of a Diffie-Hellman key exchange).

As shown by reference number 870, based on determining that it is unknown whether server device 230 supports a Diffie-Hellman key exchange, SSL inbound inspection module 310 may hand over establishment of the SSL/TLS session and management of encrypted traffic, associated with the SSL/TLS session, to SSL forward proxy module 320. As shown by reference number 880, SSL forward proxy module 320 may proceed with establishing the SSL/TLS session using the SSL forward proxy technique. For example, SSL forward proxy module 320 may determine, based on a server hello message, whether server device 230 supports a Diffie-Hellman key exchange, and may establish the SSL/TLS session accordingly. In this example, as shown by reference number 890, security device 220 may also store server cipher preference information (e.g., create a server cipher cache entry), determined based on the server hello message, for future use in determining whether server device 230 supports use of a Diffie-Hellman key exchange. Security device 220 may then manage encrypted traffic for the SSL/TLS session using the SSL forward proxy technique.

As indicated above, FIG. 8 is provided merely as an example. Other examples are possible and may differ from what was described with regard to FIG. 8.

Implementations described herein may allow a security device to determine when a secure session is to be established using a Diffie-Hellman key exchange and, based on the determination, identify a decryption technique to be used when establishing and managing the secure session. In this way, the security device may implement a first decryption technique (e.g., the SSL inbound inspection technique) when possible, which may lead to increased SSL decryption throughput as compared to implementing a second decryption technique (e.g., the SSL forward proxy technique).

Moreover, in some implementations, use of the SSL forward proxy technique may result in splitting of a TCP connection associated with a SSL/TLS session after receiving a packet associated with the TCP connection. Such dynamic engagement of a TCP proxy technique (e.g., on an as-needed basis) may result in benefits associated with managing the TCP connection and/or in other scenarios unrelated to SSL.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "group" and "set" are intended to include one or more items (e.g., related items, unrelated items, a combination of related items and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method comprising:
   identifying, by a device, priority information associated with key exchange ciphers;
   determining, by the device and based on the priority information, a first priority of a Diffie-Hellman key exchange;
   determining, by the device and based on the priority information, a second priority of an RSA key exchange;
   determining, by the device, that a particular decryption technique is to be used to manage encrypted traffic associated with a session;
   determining, by the device and after determining that the particular decryption technique is to be used to manage the encrypted traffic associated with the session, a preference for using the Diffie-Hellman key exchange based on the first priority of the Diffie-Hellman key exchange and the second priority of the RSA key exchange; and
   establishing, by the device, a session based on determining the preference for using the Diffie-Hellman key exchange.

2. The method of claim 1, further comprising:
   receiving a message associated with initiating the session; and
   determining client cipher information included in the message,
   the client cipher information including the priority information associated with the key exchange ciphers.

3. The method of claim 1, further comprising:
   performing a server cipher preference cache lookup based on a message, for initiating the session, after determining the preference for using the Diffie-Hellman key exchange,
   where establishing the session comprises:
      establishing the session based on performing the server cipher preference cache lookup.

4. The method of claim 3, further comprising:
   receiving the message for initiating the session,
      the message including a server indicator for a server device associated with initiating the session,
      wherein performing the server cipher preference cache lookup comprises:
         performing the server cipher preference cache lookup, using the server indicator, to determine whether the server device supports use of the Diffie-Hellman key exchange to establish the session.

5. The method of claim 1, further comprising:
   determining whether a server device, associated with the session, supports use of the Diffie-Hellman key exchange to establish the session,
   where establishing the session comprises:
      establishing the session based on determining whether the server device, associated with the session, supports use of the Diffie-Hellman key exchange to establish the session.

6. The method of claim 5, where the session is established after determining that it is unknown whether the server device supports use of the Diffie-Hellman key exchange.

7. A device comprising:
a memory; and
one or more processors to:
identify priority information associated with key exchange ciphers;
determine, based on the priority information, a preference for using a Diffie-Hellman key exchange;
perform a server cipher preference cache lookup based on a message, for initiating a session, after determining the preference for using the Diffie-Hellman key exchange; and
establish the session based on performing the server cipher preference cache lookup.

8. The device of claim 7, where the one or more processors are further to:
receive the message for initiating the session; and
determine client cipher information included in the message,
the client cipher information including the priority information associated with the key exchange ciphers.

9. The device of claim 7,
where the one or more processors are further to:
determine that a particular decryption technique is to be used to manage encrypted traffic associated with the session, and
where, when determining the preference for using the Diffie-Hellman key exchange, the one or more processors are to:
determine, based on the priority information, the preference for using the Diffie-Hellman key exchange after determining that the particular decryption technique is to be used to manage the encrypted traffic associated with the session.

10. The device of claim 7, where, when determining the preference for using the Diffie-Hellman key exchange, the one or more processors are to:
determine, based on the priority information, a first priority of the Diffie-Hellman key exchange,
determine, based on the priority information, a second priority of an RSA key exchange, and
determine the preference for using the Diffie-Hellman key exchange based on the first priority of the Diffie-Hellman key exchange and the second priority of the RSA key exchange.

11. The device of claim 7,
where the one or more processors are further to:
determine whether a server device, associated with the session, supports use of the Diffie-Hellman key exchange to establish the session, and where, when establishing the session, the one or more processors are to:
establish the session based on determining whether the server device, associated with the session, supports use of the Diffie-Hellman key exchange to establish the session.

12. The device of claim 11, where the session is established after determining that it is unknown whether the server device supports use of the Diffie-Hellman key exchange.

13. The device of claim 7, where the one or more processors are further to:

receive the message for initiating the session,
wherein the message includes a server indicator for a server device associated with initiating the session, and
wherein the server cipher preference cache lookup is performed using the server indicator.

14. A non-transitory computer-readable medium storing instructions, the instructions comprising:
one or more instructions that, when executed by a device, cause the device to:
identify priority information associated with key exchange ciphers;
determine, based on the priority information, a first priority of a Diffie-Hellman key exchange;
determine, based on the priority information, a second priority of an RSA key exchange;
determine, based on the first priority of the Diffie-Hellman key exchange and the second priority of the RSA key exchange, a preference for using the Diffie-Hellman key exchange;
determine that it is unknown whether a server device, associated with a session, supports use of the Diffie-Hellman key exchange to establish the session; and
establish, after determining that is unknown whether the server device supports use of the Diffie-Hellman key exchange to establish the session, the session based on determining the preference for using the Diffie-Hellman key exchange.

15. The non-transitory computer-readable medium of claim 14, where the instructions further comprise:
one or more instructions that, when executed by the device, cause the device to:
receive a message associated with initiating the session; and
determine client cipher information included in the message,
the client cipher information including the priority information associated with the key exchange ciphers.

16. The non-transitory computer-readable medium of claim 14,
where the instructions further comprise:
one or more instructions that, when executed by the device, cause the device to:
determine that a particular decryption technique is to be used to manage encrypted traffic associated with the session, and
where the preference for using the Diffie-Hellman key exchange is determined after determining that the particular decryption technique is to be used to manage the encrypted traffic associated with the session.

17. The non-transitory computer-readable medium of claim 14,
where the instructions further comprise:
one or more instructions that, when executed by the device, cause the device to:
receiving a message associated with initiating the session.

18. The non-transitory computer-readable medium of claim 17, wherein the message includes a server indicator for the server device.

19. The non-transitory computer-readable medium of claim 14, wherein the one or more instructions to determine that it is unknown whether the server device supports use of the Diffie-Hellman key exchange to establish the session comprise:

one or more instructions that, when executed by the device, cause the device to:
  perform a server cipher preference cache lookup, using a server indicator of the server device, to determine that it is unknown whether the server device supports use of the Diffie-Hellman key exchange to establish the session.

* * * * *